United States Patent [19]

Laws

[11] Patent Number: 4,780,330
[45] Date of Patent: Oct. 25, 1988

[54] A METHOD OF PRODUCING ISOMERIZED HOP PREPARATIONS

[75] Inventor: Derek R. J. Laws, Bexley Heath, England

[73] Assignee: The Brewing Research Foundation, Surrey, England

[21] Appl. No.: 25,396

[22] Filed: Mar. 13, 1987

[30] Foreign Application Priority Data

Mar. 25, 1986 [GB] United Kingdom ................ 8607258

[51] Int. Cl.$^4$ .............................................. C12C 9/02
[52] U.S. Cl. .................................... 426/600; 426/448
[58] Field of Search ............... 426/425, 651, 655, 592, 426/16, 600, 523, 431, 509, 448

[56] References Cited

U.S. PATENT DOCUMENTS

| | | | |
|---|---|---|---|
| 1,149,704 | 8/1915 | Wahl | 426/431 |
| 2,816,032 | 12/1957 | Heyer | 426/431 |
| 2,893,870 | 7/1959 | Ritter | 426/16 |
| 3,364,033 | 1/1968 | Spetsig | 426/600 |
| 3,765,903 | 10/1973 | Clarke et al. | 426/600 |
| 4,123,561 | 10/1978 | Grant | 426/600 |
| 4,154,865 | 5/1979 | Grant | 426/600 |
| 4,324,810 | 4/1982 | Goldstein | 426/16 |
| 4,418,092 | 11/1983 | Blackwell | 426/16 |
| 4,640,841 | 2/1987 | Forster | 426/425 |

FOREIGN PATENT DOCUMENTS

| | | | |
|---|---|---|---|
| 52643 | 3/1972 | Australia | 426/600 |
| 700469 | 12/1964 | Canada | 426/600 |
| 744211 | 6/1970 | France | 426/600 |
| 50-10399 | 4/1975 | Japan | 426/600 |

Primary Examiner—Donald E. Czaja
Assistant Examiner—Carolyn Paden
Attorney, Agent, or Firm—Frishauf, Holtz, Goodman & Woodward

[57] ABSTRACT

A method for the production of isomerized hop preparations comprising admixing whole or powdered hops with a solid or aqueous alkali or alkaline earth metal salt. The invention provides that the resultant admixture is simultaneously subjected to a pressure of at least 2 Kg/cm$^2$ and at a temperature of at least 80° C. in a closed vessel, thereby to form a hop preparation high in iso-α-acids and with substantially undegraded hop oils. The closed vessel is preferably an extrusion cooker.

5 Claims, 1 Drawing Sheet

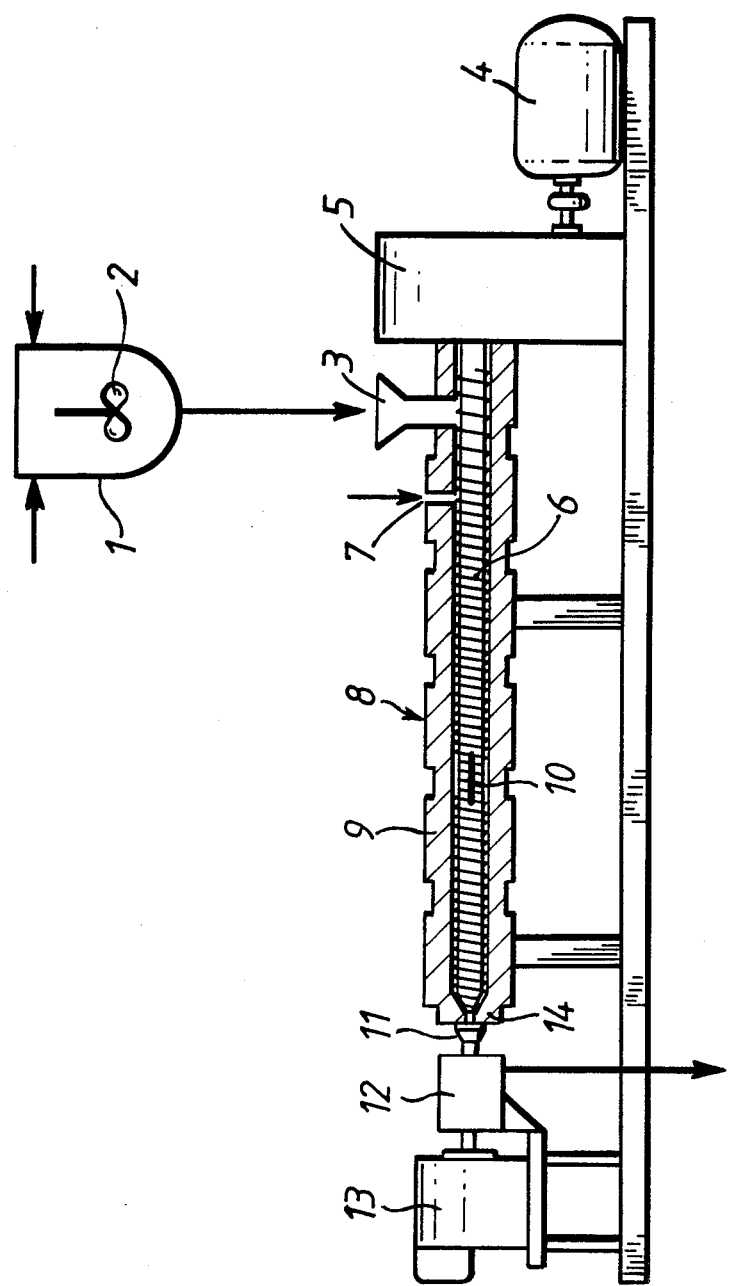

METHOD OF PRODUCING ISOMERIZED HOP PREPARATIONS

BACKGROUND OF THE INVENTION

1. Field of the Invention

The present invention relates to isomerized hop preparations and to a method for the production of the same.

2. Discussion of Prior Art

For many years dried hop cones have been used in the brewing process to provide beer with a bitter taste and a hoppy aroma. Hop oils which comprise 0.5–2% by weight of the hops are responsible for the aroma, whereas beer bitterness is provided in the main by the α-acid fraction of hop resins; said α-acids constituting 4–12% by weight of the hops. Hops are boiled with the brewers' wort during the brewing process and the α-acids are converted by isomerization into soluble bitter iso-α-acids.

This process is not particularly efficient and in addition a proportion of the iso-α-acids are lost during the brewing process such that only 20–40% of the α-acids are to be found as corresponding iso-α-acids in the finished beer.

Furthermore hops slowly deteriorate in storage losing both α-acids and hop oils as a result of oxidation.

The problem of hop storage has been addressed by forming the raw hops into hop extracts by extracting them with a solvent such as hexane, liquid carbon dioxide or methylene chloride and storing the hop extract in sealed containers.

Alternatively, the raw hops are powdered, then pelletised and packaged in evacuated packs. However, in order to utilize such extracts or pellets, they must be boiled in the brewers' wort in order to convert the α-acids to iso-α-acids and hence an increase in utilization of only 10% or so (i.e. from 20 to 22%) occurs. Thus, it will be appreciated that the traditional requirement for the conversion of α-acids to iso-α-acids requires the α-acids to be boiled with the wort and hence not only is the conversion to iso-α-acids low, but further losses ensue as a result of precipitation during wort boiling and cooling, and due to adherence on the surface of the yeast during fermentation.

Hop utilization can be improved by adding isomerized hop extracts to the beer after fermentation thereby avoiding losses of iso-α-acids during the boiling and fermentation processes. Such extracts are produced by converting the α-acids present in solvent extracts of hops into iso-α-acids by boiling with dilute aqueous alkali salts such as sodium or potassium hydroxides or carbonates for 30–60 minutes. However, this has the con-commitant difficulty that hop oils tend to be degraded during boiling and it is normal practice to remove the oils during the preparation of isomerized extracts.

Alternatively, solvent extracts of the hops may be treated with magnesium or calcium salts to precipitate the α-acids from suitable solvent extracts thereof. The salts are then heated to effect the isomerization reaction and to produce the corresponding iso-α-acids as their calcium or magnesium salts. These salts have only limited solubility and require an extended contact with the beer. Of course isomerized extracts can be added to the boiling wort and this indeed results in a marked improvement in hop utilization. However, the production of these extracts involves a multi-stage process of solvent extraction purification, preparation of a fraction rich in α-acids, isomerization and hop oil removal. Hence the processing costs tend to be high and it is not commercially attractive to use isomerized extracts during wort boiling.

To this end hop pellets have been prepared as discussed in U.S. Pat. No. 4,123,561. In this Disclosure the alkaline earth oxides, magnesium and calcium oxide, are admixed with powdered hops and pelletised. In this process α-acids are converted to their more stable salts, and as a result heat is generated and some isomerization occurs. Subsequent anaerobic heating of the pellets in a controlled manner results in the production of isomerized pellets in which over 90% of the initial α-acids are converted into the corresponding magnesium or calcium salts of the iso-α-acids. Whereas such a process is suitable for the production of iso-α-acids, hop oils tend to be degraded during heating thereby leading to a cheesy aroma. This tends to lead to problems in brewing and hence the process of U.S. Pat. No. 4,123,561 is of limited applicability. Furthermore, a pelletisation step is required in this process. This gives pellets which tend to remain coherent in the brewers' wort and hence a significant percentage of the available iso-α-acids do not in fact get utilized in the brewing process.

Extrusion cooking is a widely used process in the food industry for the production of breakfast cereals, pet foods and various snack products. An extrusion cooker in its simplest form comprises an Archimedian screw rotating inside a closed cylindrical barrel which can be heated on a zone basis to control temperatures along the length thereof. Generally the product in its precooked form is moistened and introduced into the cooker where it is cooked by a combination of pressure, heat and mechanical shear, said shear including being forced through a die at between 3.5 and 25 Kg/cm$^2$ at the end of the cooking process. Forcing the product through the die causes an immediate expansion of the product on exit due to the flashing of steam under pressure.

SUMMARY OF THE INVENTION

The present invention relates to the production of an isomerized hop preparation comprising admixing whole or powdered hops with a solid or aqueous alkali or alkaline earth metal salt. The invention is characterized by subjecting the resultant admixture simultaneously to a pressure of at least 2 Kg/cm$^2$ and a temperature of at least 80° C. in a closed vessel thereby to provide a hop preparation which is high in iso-α-acids and undergraded hop oils.

Below 80° C. the reaction is too slow to be of practical interest. At 100° C. the reaction speed increases markedly and so it is preferred to use a temperature of at least 100° C.

In a preferred form of the invention this is effected in an extrusion cooker in which the admixture may be additionally subjected to shear. The process may thus be effected on a continuous basis. Preferably the dwell time within the extrusion cooker is a period of less than 10, and preferably 1–5 minutes.

Powdered hops is the preferred raw material. The alkali or alkaline earth metal salts are preferably sodium, potassium, magnesium or calcium; preferably in the form of powders or aqueous solutions of the carbonates or hydroxides of sodium and potassium. Where a powder of an alkaline earth is used, this could be of the oxide instead of the hydroxide or carbonate.

In a particularly preferred form of the invention a portion of the mechanical shear is imparted by forcing the extract through a die, most preferably at a pressure of between 3.5 to 24.5 Kg/cm$^2$ at a temperature in excess of 100° C. whereby the flashing of steam causes an expansion of the compacted extrudate to a coherent but friable rope, which is conveniently chopped into pellet form. The moisture content of the admixture entering the closed vessel is preferably between 6 and 30% and normally between 8 and 25%.

The molar ratio of alkali or alkaline earth metal salt to α-acid may be about 2:1. However, other ratios may be preferable. A useful temperature for conversion within the extrusion cooker is in the region of 140° C., other values of 120° C., 130° C., 150° C., 160° C. being useful in some circumstances.

Isomerized hop preparations produced using alkali metal salts are particularly advantageous in brewing. Because of the enhanced solubility of the resulting iso-α-acids, high utilizations can be achieved by adding the preparations to wort at the start of boiling or a few minutes before the end of boiling, or to wort in a Whirlpool Separator. This contrasts with isomerized hop preparations made from the alkaline earth metals which are not very soluble and frequently do not disperse very readily in wort. Thus there is an improvement in the utilization of bitter substances when isomerized hop preparations made from alkali metal salts are used in brewing.

Powdered salts are to be preferred to aqueous solutions. Small additions of moisture during the process in the closed vessel may be made if desired, but it is sometimes difficult to achieve even wetting and homogeneous mixing simultaneously. Thus homogeneous mixing is better achieved by a thorough mixing of the hops and powdered salts prior to treatment in the closed vessel.

In a further aspect of the invention there is provided an isomerized hop preparation in the form of alkali or alkaline earth metal salt characterized by a high iso-α-acid content, preferably at least 39% of the original α-acid content, and by a substantially undegraded hop oil content of at least 50% of the hop oil prior to treatment.

The product most preferably contains 56–83% of undegraded hop oil although higher amounts may be possible, while the iso-α-acid content is preferably at least 50% of the original α-acid content.

The hop preprations in accordance with the present invention are most preferably added to the boiling wort in the kettle, or to wort in Whirlpool Separators, during the brewing process. They are dual purpose products which are ideal for imparting both bitterness and a hoppy aroma to beer.

DETAILED DESCRIPTION OF EMBODIMENTS OF THE INVENTION

The invention will now be described, by way of illustration only, with reference to the following examples and to the accompanying drawing.

The drawing shows in transverse cross-section a diagrammatic representation of an extrusion cooker as utilized in a preferred form of the invention.

With reference to the drawing an elongate barrel assembly (8) is provided with a coaxial screw (6) adapted on rotation to carry products along its length. Screw (6) is provided over a portion thereof with a plurality of paddles (10) to alter the compaction characteristics thereof. The screw (6) is driven by a drive motor (4) via a main drive housing (5) provided with the necessary gearing.

The barrel (8) is provided at its inlet end with an inlet (3) and adjacent thereto, but downstream thereof, with a liquid inlet (7). The outlet end of the barrel (8) terminates in a die (14). Immediately downstream of the die (14) is an extrusion chopper (12) driven by variable speed motor (13). Chopper (12) is provided with a knife (11) which acts upon the extruded product to ensure it is of a desired size.

The length of the barrel is divided into five heating zones (9) which can be heated to different temperatures as desired.

In use, hops preferably in the form of hop powder and the requisite salts are added to a hopper (1) provided with a mixing paddle (2). The mixing paddle (2) is actuated to intimately admix the hop powder and salts to provide an intimate admixture preferably with a desired moisture content. The intimate admixture is supplied to an inlet (3) while the drive motor (4) is actuated to drive the screw (6). The intimate admixture is passed along the screw (6); further water or aqueous salts being added through the inlet (7) as desired. As the admixture passes along the screw (6) it is acted upon by a plurality of heating zones (9) to raise the temperature progressively to a desired level. At the termination of the screw (6) the intimate admixture now heated to for example 140° C. is subjected to mechanical shear at the die (14) immediately prior to being released at an expanded extrudate therefrom. The expanded extrudate is acted upon by the cutting knife (11) to provide a friable product.

It will be appreciated that the portions of the heating zone can be altered in order to provide different heating regimes while the drive motor (4) can drive the screw (6) at different speeds to alter the dwell time.

The extrusion cooker just described was utilized in the following Examples:

It will be apparent from the Examples below that the yield of the desired product depends, inter alia, upon the molar ratio of the alkali to α-acid, the temperature in the various zones of the extrusion cooker, the residence time, the moisture content, and the shear applied within the cooker. Accordingly, (see Example 2) it will be seen that with a molar ratio of alkali to α-acid of 2:1 it is possible to isomerize over 70% of the α-acids utilizing a maximum temperature in the final zone of the barrel of 120° C. with a moisture content of 12%.

A convenient method of effecting the reaction in accordance with the present invention involves thoroughly mixing solid potassium or magnesium carbonate or hydroxide with the powdered hops and then introducing water during the passage of the hops along the barrel of the cooker thereby to provide the hops with the necessary moisture and alkali content.

Alternatively the reaction can be effected by metering aqueous potassium carbonate or hydroxide into the feed during passage of the hops along the barrel of the cooker thereby providing hops with the necessary moisture and alkali content in a single operation.

EXAMPLE 1

A portion (1) of powdered hops (α-acid content 9.3%) made by hammer milling Wye Target hops was mixed with sufficient solid potassium carbonate to give an alkali salt/α-acid ratio of 2:1.

The mixture was fed into a Baker Perkins twin screw extrusion cooker at a rate of 20 Kg per hour. The cooker was divided into five heating zones which were established at steady state temperatures respectively of 27° C., 60° C., 120° C., 130° C. and 130° C. With a screw speed set at 150 rpm sufficient water was added via the barrel to maintain the moisture content of the mixture at 23.9%.

Under these conditions the residence time of the powdered hops in the cooker was approximately 90 seconds; the pressure at the die aperture was 14.35 Kg/cm$^2$. The extrudate was in the form of a green-brown friable ribbon which naturally fell into pellets of 3–10 mm in length.

The extrudate pellets were analyzed for α-acids and iso-α-acids using the method of Buckee, G. K. (Journal of the Institute of Brewing 1985 91, 143). This employs high performance liquid chromatography (a sample of 10 g was shaken with a mixture of dilute hydrochloric acid (20 ml, 3M) and 100 ml of toluene for 40 minutes). 2 ml aliquots of the toluene layer were then taken and analysed according to published procedures. The analytical values obtained in this way are shown in Table 1 below. Subsequently portions of the same batch of powdered hops were extrusion cooked in a precisely similar fashion, under the following conditions:

Portion 2 Alkali/α-acid ratio 1:1, solid potassium carbonate, maximum barrel temperature 140° C.

Portion 3 Alkali/α-acid ratio 1:1, aqueous potassium carbonate, maximum barrel temperature 120° C.

Portion 4 Alkali/α-acid ratio 2:1, aqueous potassium hydroxide, maximum barrel temperature 120° C.

These extrudates were analysed using the procedures given above; the results are listed in Table 1 below.

TABLE 1

Preparation of Isomerized Hop Pellets

| Portion | α-acid content (%) | Iso-α-acid content (%) | Conversion of α-acids to iso-α-acids (%) |
|---|---|---|---|
| 1 | 3.98 | 4.83 | 52.6 |
| 2 | 3.98 | 4.03 | 42.2 |
| 3 | 4.29 | 3.74 | 39.1 |
| 4 | 4.25 | 4.12 | 42.8 |

The levels of hop oil present in the powdered hops and the extrudates were estimated using a standard procedure (see the Institute of Brewing Recommended Methods of Analysis, 1977).

The results indicated that the majority of the hop oil is retained after extrusion (56–83% depending on extrusion conditions). Additionally examination by coupled gas chromatography/mass spectroscopy indicated that the hop oil underwent little, if any, degradation during processing.

EXAMPLE 2

In these studies portions of powdered Wye Target hops (α-acid content 9.3%) were extrusion cooked with solid potassium carbonate (alkali/α-acid ratio of 2:1) using conditions and procedures similar to those described in Example 1. The moisture content of the mixture was varied from 12% to 24% and the steady state temperatures of the heating zones of the barrel were either (i) 25° C., 65° C., 100° C., 140° C., 140° C. or (ii) 25° C., 65° C., 100° C., 120° C., 120° C. In all cases the residence time of the powdered hops in the cooker was 135 seconds.

TABLE 2

Extrusion Cooking Hops and Solid Potassium Carbonate

| Portion | Moisture (%) Barrel | Moisture (%) Product | Maximum Barrel Temperature (°C.) | Conversion of α-acids to iso-α-acids (%) |
|---|---|---|---|---|
| 5 | 24 | 20.5 | 140 | 57.9 |
| 6 | 20 | 12.3 | 140 | 62.8 |
| 7 | 16 | 10.7 | 140 | 66.5 |
| 8 | 24 | 20.6 | 120 | 46.1 |
| 9 | 20 | 14.5 | 120 | 51.1 |
| 10 | 16 | 10.2 | 120 | 59.0 |
| 11 | 20 | 12.9 | 120 | 48.6 |
| 12 | 16 | 10.3 | 120 | 56.0 |
| 13 | 12 | 6.2 | 120 | 70.8 |
| 14 | — | 20.4 | 120 | 52.5 |
| 15 | 20 | 18.3 | 120 | 60.3 |

The extrudate pellets were analysed as described in Example 1 and the results are shown in Table 2. Portions 5 to 7, which were extruded at a die pressure of 3.5 Kg/cm$^2$ with a maximum barrel temperature of 140° C., showed that the conversion of α-acids to iso-α-acids increased with decreasing moisture content. However at 140° C. there was some evidence of degradation of α-acids and/or iso-α-acids which might cause problems with off-flavours in brewing. The experiment was repeated (portions 8 to 10) over the same moisture range using a die pressure of 10.5 Kg/cm$^2$ and a maximum barrel temperature of 120° C. The percentage conversion of α-acids to iso-α-acids was reduced at 120° C. but there was little evidence of degradation and the low moisture again favoured production of the desired iso-α-acids. Consequently another trial (portions 11 to 13) was carried out at 120° C. with barrel moisture of 12% to 20%. Table 2 shows that the maximum conversion of α-acids to iso-α-acids was 70.8% and this was achieved with a barrel moisture of 12%.

An attempt was made to find out if the yield of iso-α-acids could be increased by twice passing the mixture of hops and potassium carbonate through the extrusion cooker. Portions 8 to 10 (see Table 2) were combined and analysed (portion 14) and the mixture extrusion cooled with a maximum barrel temperature of 120° C. The product (portion 15) contained almost 8% more iso-α-acids than did the starting material (portion 14).

EXAMPLE 3

In this investigation a portion of Wye Target hops (α-acid content 9.2%) was extrusion cooked with solid magnesium carbonate (magnesium carbonate/α-acid molar ratio of 1:1) using conditions and procedures similar to those described in Example 2. The mixture was thoroughly mixed prior to extrusion and its moisture content was adjusted to 10.0% by introducing water to the mixture in the barrel at the start of extrusion cooking. The steady state temperatures of the heating zones of the barrel were maintained at: 25° C., 65° C., 120° C., 140° C. and 140° C. Analysis of the extrudate, using the procedure described in Example 1, showed that 40.3% of the α-acids had been converted into the desired iso-α-acids and the moisture content of the product was 5.4%.

EXAMPLE 4

Ale was brewed on a pilot scale following a standard procedure (see Journal American Society Brewing Chemists 1976, 34, 166).

43.2 g of an extrudate (Portion 1 of Example 1) having an iso-α-acid content of 4.83%, α-acid content of 3.98% was boiled with 59 liters of wort having a specific gravity of 1.040 produced from a 100% ale malt.

A control ale was similarly produced utilizing sufficient liquid carbon dioxide extract in the kettle to give an initial concentration of 110 ppm of α-acids in the wort.

Both worts were fermented utilizing yeast N.C.Y.C. 1342 and the experimental ale, bittered using the extrudate, containing 23.7 ppm of iso-α-acids giving a utilization of 41.8%. The corresponding utilization for the control ale containing 24.7 ppm iso-α-acid was 22.4%. Both ales were of sound flavour and other properties.

Accordingly, Example 4 shows that by utilizing extrusion cooked hop products containing 52.6% iso-α-acids in the brewing process a substantial improvement in hop utilization is achieved (control ale 22.4%, ale brewed from extruded product 41.7%; an increase in efficiency of 86.1%).

EXAMPLE 5

A lager beer was produced on the pilot-scale by mashing a lager malt (7.3 Kg) using an infusion system at 68° C. The wort was collected in the kettle and hydrolysed maize syrup (1.8 Kg Fermentose 275 from Tunnel Refineries Ltd.) was added to give a sweet wort of specific gravity 1.045. 32.5 g of an extrudate containing 5.5% iso-α-acids and 2.25% of α-acids (prepared from Wye Target hops and solid potassium carbonate according to Example 2) was added to this sweet wort (59 liters), the mixture was boiled for 1 hour and solids were removed using a hop back with the plate covered with muslin cloth. The specific gravity of the clarified wort was then adjusted to 1.041 with water treated with calcium sulphate and two portions (2×18 liters) were fermented for 6 days in conical fermentation vessels at 12° C. using yeast N.C.Y.C. 1324. The bulk of the yeast was removed from the cone of each vessel after 5 days fermentation and at the end of fermentation the green beer (specific gravity 1.006) was placed in casks and conditioned for 6 days at 13° C. followed by 5 days at 0° C. The beers were then filtered using a sheet filter and diluted to an original gravity of 1034 using deoxygenated water. The filtered lagers were treated with solid carbon dioxide (90 g) and stored at 0° C. for 7 days to final filtration and bottling.

A control lager was brewed in a similar way using powdered Wye Target hops (54.4 g., α-acid content 9.3%) which had not been subjected to extrusion cooking.

The lager beers were analysed using standard procedures (see The Institute of Brewing Recommended Methods of Analysis, March 1982) and the results are listed in Table 4.

TABLE 4

| Analysis of Lager Beers | | |
|---|---|---|
| | Lager Beers | |
| | Experimental | Control |
| pH | 4.2 | 4.0 |
| Colour (°EBC) | 4.7 | 4.7 |
| Specific Gravity | 1.006 | 1.006 |
| Total Nitrogen (mg/liter) | 395 | 380 |
| Amino Nitrogen (mg/liter) | 60 | 49 |
| Bitterness (B.U.) | 20 | 21 |
| Initial Haze (EBC units) | 0.45 | 0.42 |
| Head Retention Value (secs) | 90 | 90 |

TABLE 4-continued

| Analysis of Lager Beers | | |
|---|---|---|
| | Lager Beers | |
| | Experimental | Control |
| Headspace Air (ml) | 0.5 | 0.6 |
| Hop Utilization (%) | 65.7 | 30.2 |

The two beers were of sound flavour and other properties and their analytical results were generally as expected for lagers brewed on the pilot scale. However, hop utilization for the beers were substantially different. The utilization for the beer bittered with powdered Wye Target hops (control) was just over 30% whilst that for the corresponding lager bittered with the extruded hop preparation (Experimental) approached 66%. Hence there is a considerable advantage, in terms of utilizing the bitter resins in brewing, to extrude a mixture of powdered hops and alkali prior to use.

Examples 4 and 5 show that the percentage increase in utilization is accordingly greater than that reported in the prior art.

From the foregoing it will be apparent that the advantages of utilizing pellets in accordance with the invention are as follows:

(a) Because of the high solubility of the potassium salts of iso-α-acids high utilizations are achieved by adding the hop preparation to wort at the start of boiling. Even higher utilizations are achieved by adding the pellets to the wort towards the end of the boiling process, or even in the Whirlpool separator during subsequent processing. Accordingly losses associated with wort boiling are minimized, and hop utilization is enhanced.

(b) During extrusion cooking some hop oil is lost when the steam flashes off. However, the majority remains in the product and is chemically unchanged. Thus the resulting pellets impart both a bitter taste and a hoppy aroma to the beer. The pellets of the prior art tend to have a cheesy aroma rather than the aroma of fresh hops.

Accordingly, the present invention encompasses a method for the production of isomerized hop preparations per se, and a method of brewing beer utilizing such a hop preparation.

I claim:

1. A method for the production of isomerized hop preparations which comprises admixing whole or powdered hops with a solid or aqueous alkali or alkaline earth metal salt, and thereafter subjecting the resultant admixture to extrusion cooking, said extrusion cooking comprising subjecting the admixture simultaneously to a pressure of at least 2 Kg/cm$^2$ and a temperature of at least 80° C. in a closed vessel and further subjecting the admixture to shear and to a sudden release of pressure to form coherent friable pellets of a hop preparation high in iso-alpha-acids and with substantially undergraded hop oils.

2. The method of claim 1 wherein the salts are selected from the group consisting of carbonates, oxides and hydroxides of sodium, potassium, magnesium or calcium.

3. The method of claim 1 wherein the dwell time in the closed vessel is from 1 to 5 minutes and the pressure is from 3.5 to 25 Kg/cm$^2$.

4. The method of claim 1 wherein the temperature is within the range of 120° C. to 160° C.

5. The method of claim 1 wherein the salt is an alkali metal salt, the temperature is about 120° C. and the moisture content of the admixture is in a range of from 8 to 25%.

* * * * *